(12) United States Patent
Cai et al.

(10) Patent No.: US 9,304,742 B2
(45) Date of Patent: Apr. 5, 2016

(54) MODIFYING A MIDDLEWARE

(71) Applicant: INTERNATIONAL BUSINESS MACHINES CORPORATION, Armonk, NY (US)

(72) Inventors: JunJie Cai, Durham, NC (US); San Hong Li, Shanghai (CN); Jing Lv, Shanghai (CN); Wei Wei Gao, Shanghai (CN); Chen Lei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/472,556

(22) Filed: Aug. 29, 2014

(65) Prior Publication Data

US 2014/0372977 A1  Dec. 18, 2014

Related U.S. Application Data

(63) Continuation of application No. 14/073,569, filed on Nov. 6, 2013.

(30) Foreign Application Priority Data

Nov. 30, 2012  (CN) .......................... 2012 1 0505784

(51) Int. Cl.
  *G06F 9/44* (2006.01)
  *G06F 9/445* (2006.01)
(52) U.S. Cl.
  CPC ... *G06F 8/30* (2013.01); *G06F 8/67* (2013.01)
(58) Field of Classification Search
  CPC .................... G06F 8/30; G06F 8/67
  USPC ......................................................... 717/110
  See application file for complete search history.

(56) References Cited

U.S. PATENT DOCUMENTS

| 7,627,866 | B2 | 12/2009 | Bunker |
| 8,250,559 | B2 | 8/2012 | Daynes |
| 8,261,297 | B2 | 9/2012 | Kabanov |
| 2008/0120129 | A1* | 5/2008 | Seubert et al. ................... 705/1 |

(Continued)

OTHER PUBLICATIONS

Previtali, Dynamic Updates: Another Middleware Service?, 2007, ACM, pp. 49-54.*

(Continued)

*Primary Examiner* — John Chavis
(74) *Attorney, Agent, or Firm* — Eustace P. Isidore; Yudell Isidore PLLC (57) ABSTRACT

A method for modifying a middleware shared by multiple tenants by preparing a data packet comprising modification information and tenant information, the modification information comprising information of a specific class to be modified in the middleware as well as modification content for the specific class, the tenant information indicating a specific tenant of the plurality of tenants to which the modification content is directed; and in response to acquisition of the data packet: modifying the specific class in the middleware in runtime according to the modification information to create a modified specific class; and applying the modified content only to the specific tenant. When multiple tenants share a same middleware, different versions of the middleware may be provided for respective tenants, without affecting the use by other tenants, thereby satisfying sharing and customization requirements of each of the multiple tenants.

12 Claims, 7 Drawing Sheets

(56) References Cited

U.S. PATENT DOCUMENTS

2010/0199259 A1    8/2010    Quinn
2012/0173581 A1    7/2012    Hartig

OTHER PUBLICATIONS

Roman et al., Dynamically Programmable and Reconfigurable Middleware Services, 2004, LNCS, pp. 372-396.*

Finalization Denial of Service Prevention for Multitenant Cloud Java, IP.com Prior Art Database Disclosure, IP.com Disclosure No. IPCOM000215983D, Publication Date Mar. 15, 2012.

Storing Profiling Information for Use in Future Virtual Machine Invokations for Optimization Decisions, IP.com Prior Art Database Disclosure, IP.com Disclosure No. IPCOM000216308D, Publication Date Mar. 29, 2012.

U.S. Appl. No. 14/073,569 entitled "Modifying a Middleware"; Non-final office action dated Feb. 13, 2015 (13 pg).

* cited by examiner

MODIFYING A MIDDLEWARE

PRIORITY CLAIM

The present application is a continuation of U.S. patent application Ser. No. 14/073,569, titled "Modifying a Middleware," filed on Nov. 6, 2013, which also claims benefit of priority under 35 USC §120 and §365 to the previously filed China Patent Application No. 201210505784.4, titled, "Modifying a Middleware" with a priority date of Nov. 30, 2012. The contents of each application is incorporated by reference herein.

BACKGROUND

1. Technical Field

The present disclosure relates to a shared middleware in an application server environment. More specifically, the present disclosure relates to a method and apparatus for modifying a middleware shared between multiple tenants.

2. Description of the Related Art

In order to provide isolation in an application server environment among tenants in a multi-tenant shared system, one system provided in the art is defining multiple partitions in a database, each of which is independently associated with a single tenant. A content portion shared by all the tenants in the system is stored in the database, and the tenant specific content portion corresponding to each tenant is stored in its own partition. This solution does not allow dynamic modification of the middleware in the runtime process. Furthermore, providing a customized runtime environment to individual tenants is cumbersome due to space requirements necessitated by using an individual partition for each tenant.

BRIEF SUMMARY

Disclosed is a method and apparatus for providing different versions of a shared middleware to a plurality of tenants by customizing and modifying the running middleware. While multiple tenants share the same middleware, different versions of the middleware may be provided for each different tenant, without affecting the use of other tenants, to meet the individual customization and sharing requirements for each tenant. According to one aspect of the present disclosure, there is provided a method for modifying a middleware shared by multiple tenants, comprising: preparing a data packet comprising modification information and tenant information, the modification information comprising information of a specific class to be modified in the middleware as well as modification content for the specific class, the tenant information indicating a specific tenant of the plurality of tenants to which the modification content is directed; and in response to acquisition of the data packet: modifying the specific class in the middleware in runtime according to the modification information to create a modified specific class; and applying the modified content only to the specific tenant.

According to another aspect of the present disclosure, there is provided an apparatus for modifying a middleware shared by multiple tenants, the apparatus comprising: a processing unit, a memory, and program code that when executed by the processing unit enables the apparatus to: prepare a data packet comprising modification information and tenant information, the modification information comprising information of a specific class to be modified in the middleware as well as modification content for the specific class, the tenant information indicating a specific tenant of the plurality of tenants to which the modification content is directed; and in response to acquisition of the data packet: modify the specific class in the middleware in runtime according to the modification information to create a modified specific class; and apply the modified content only to the specific tenant.

The above as well as additional objectives, features, and advantages of the present innovation will become apparent in the following detailed written description.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate, by way of example, embodiments of the present disclosure and explain principles and advantages of the present disclosure.

DETAILED DESCRIPTION OF AN ILLUSTRATIVE EMBODIMENT

Described herein is an apparatus, method, and computer program product for providing different versions of a shared middleware to a plurality of tenants. Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the present disclosure. However, it will be understood by those skilled in the art that the present disclosure may be practiced without these specific details. In other instances, well-known methods, procedures, and components have not been described in detail so as not to obscure the present disclosure.

Figure 1:
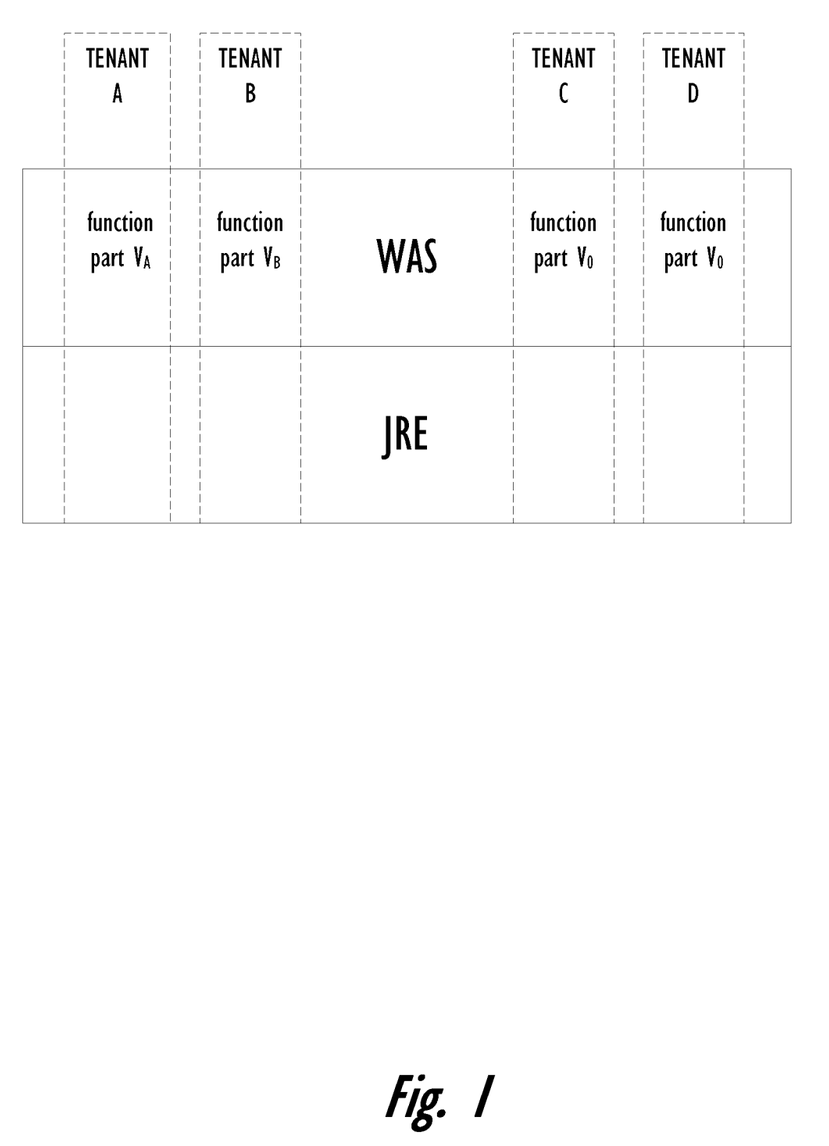
FIG. 1 is a block diagram of a schematic diagram of a shared middleware according to an embodiment of the present disclosure.

FIG. 1 illustrates a schematic diagram of a shared middleware according to an embodiment of the present disclosure. In the schematic diagram of FIG. 1, WebSphere Application Server (WAS) is a middleware run in a Java Runtime Environment (JRE). Multiple tenants, A, B, C, and D, all share and run their respective user applications via the WAS middleware. Each tenant may have its own customization requirements for the middleware. For example, tenant A might want to modify a certain functional part of the middleware to form a version $V_A$ to meet its specific application requirements, tenant B may want to update and upgrade the functional part to form a version $V_B$ to improve operating performance, while tenants C and D simply might want to maintain the original default version $V_0$ of the middleware.

Figure 2:
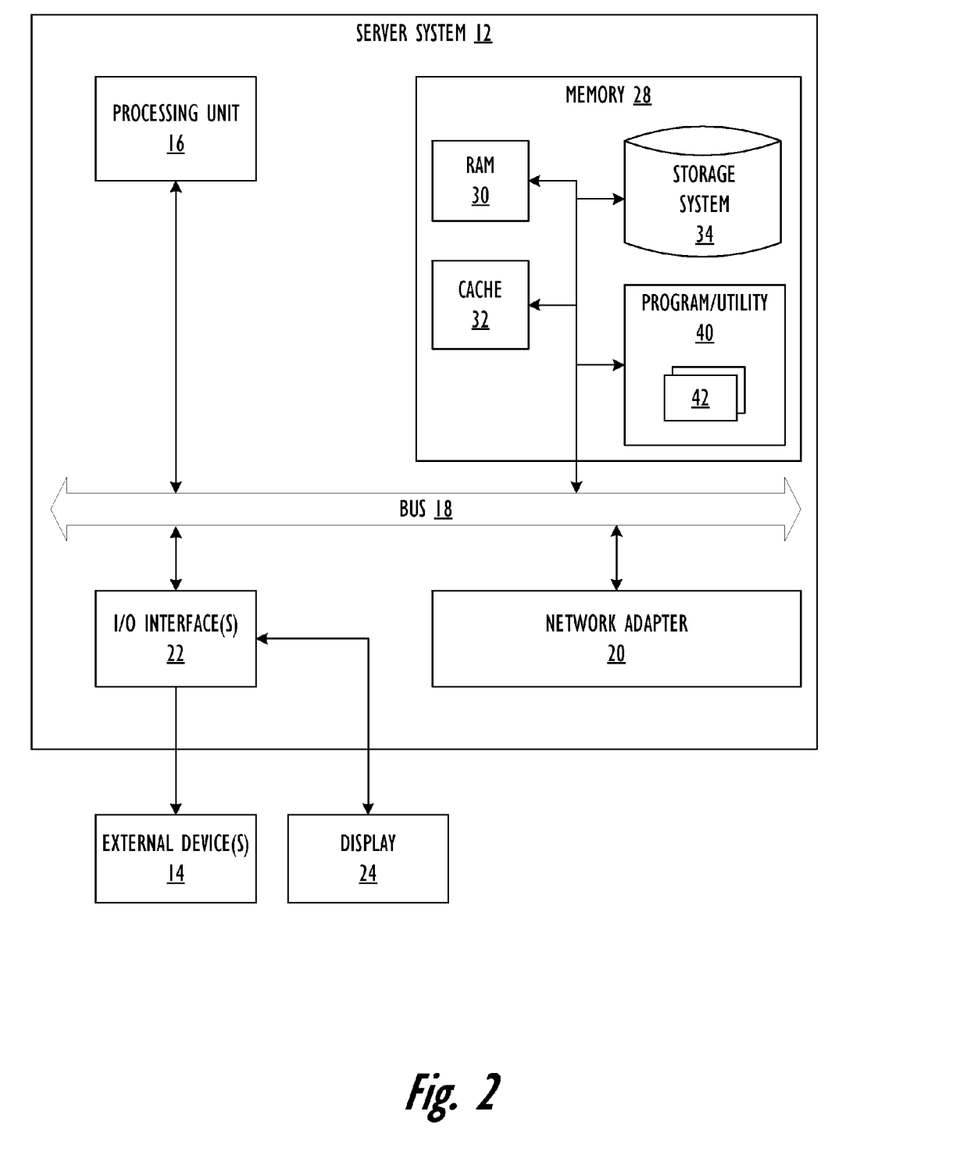
FIG. 2 is a block diagram of an exemplary server system according to an embodiment of the present disclosure.

Referring now to FIG. 2, there is illustrated a block diagram of an exemplary server system 12 for implementing the various embodiments of the present disclosure. Server system 12 is shown in the form of a general-purpose computing device. The components of server system 12 may include, but are not limited to, a processing unit 16 (which may comprise one or more processors or processing units), a system memory 28, and a bus 18 that couples various system components including system memory 28 to processing unit 16.

Bus 18 represents one or more of any of several types of bus structures, including, for example, a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server system 12 may also include a variety of computer-readable system media. Such media may be any available media that is accessible by server system 12, including both volatile and non-volatile media, removable media, and non-removable media.

System memory 28 comprises volatile memory, including random access memory (RAM) 30 and/or cache memory 32. Server system 12 may further include other types of removable/non-removable and volatile/non-volatile storage media. Storage system 34 includes a non-removable, non-volatile magnetic media (not shown) such as a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may also be included in storage system 34 and can be connected to bus 18 by one or more data media interfaces. As will be further depicted and described below, system memory 28 includes at least one program product having at least one set of program modules configured to carry out the functions of embodiments of the disclosure.

Program/utility 40, having at least one set of program modules 42, can be stored in memory 28 by way of, for example, an operating system, one or more application programs, other program modules, and program data. Each of the operating system, one or more application programs, other program modules, and program data or any some combination thereof, may further include an implementation of a networking environment. Program modules 42 may include functions and/or methodologies for carrying out embodiments of the present disclosure.

Server system 12 may also communicate via Input/Output (I/O) interfaces 22 with display 24 and one or more external devices 14 that enable a user to interact with server system 12. External devices 14 may include a keyboard, a pointing device, and/or any devices that enable server system 12 to communicate with one or more other computing devices (e.g., a network interface card or a modem). Server system 12 can also communicate with one or more networks such as a local area network (LAN), a general wide area network (WAN), and/or a public network (e.g., an Internet) via network adapter 20. As depicted, network adapter 20 communicates with the other components of server system 12 via bus 18. It should be appreciated that although not shown, other hardware and/or software components could be used in conjunction with server system 12. Examples, include, but are not limited to: microcode, device drivers, redundant processing units, external disk drive arrays, RAID systems, tape drives, and data archival storage systems.

Figure 3:
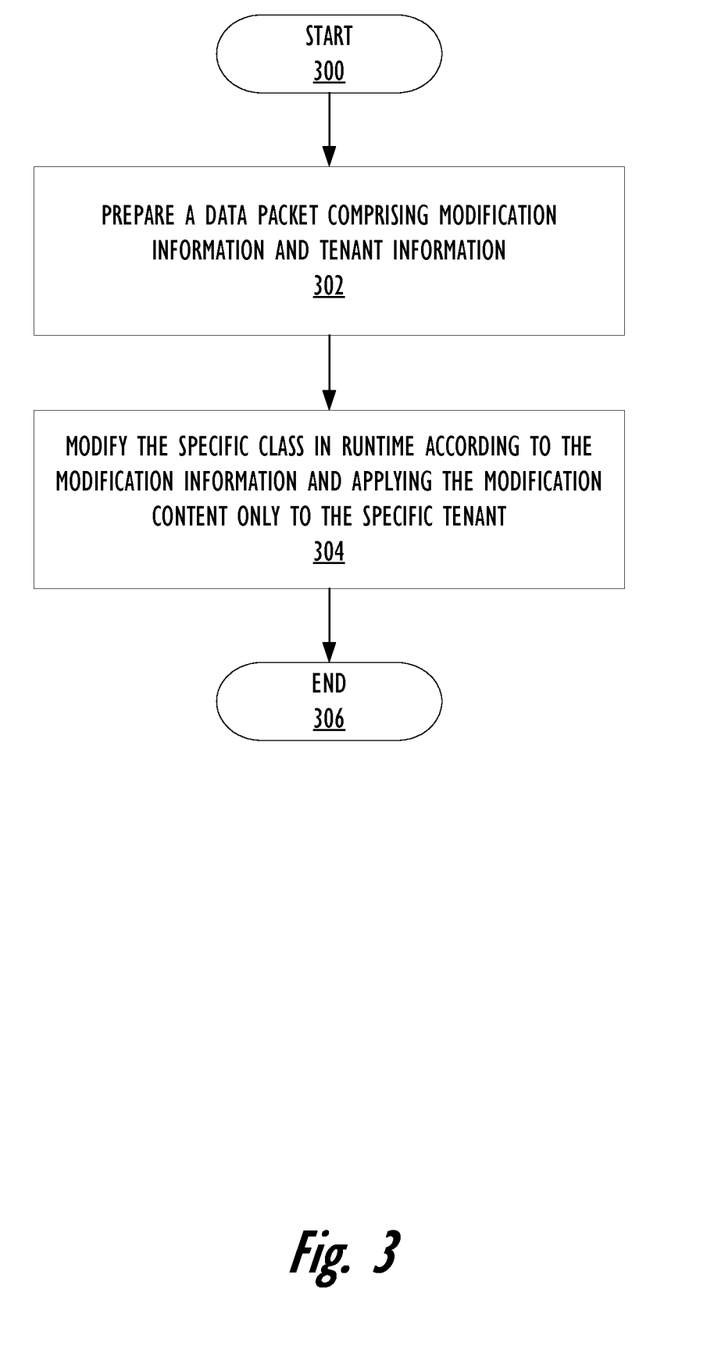
FIG. 3 is a flow diagram of a method for modifying a middleware according to an embodiment of the present disclosure.

Referring now to FIG. 3, which shows a flowchart of a method for modifying a middleware according to an embodiment of the present disclosure. At step 302 a data packet comprising modification information and tenant information is prepared. The modification information includes information of a specific class to be modified in the middleware as well as modification content for the specific class and further indicates what modification to be made to the class in the middleware. The data packet is prepared to indicate how to modify a class in a middleware. The tenant information indicates a specific tenant to which the modification content is directed. In one embodiment, the tenant information comprises identification information of the tenant, such as tenant ID. In some cases, the tenant information also comprises information associated with the tenant for assisting in positioning the specific tenant, such as IP address of the tenant.

At step 304, in response to acquisition of the data packet, the specific class in the running middleware is modified according to the modification information. The modification content is then made to be only applied to the specific tenant. The execution of the above steps is described below in combination with specific examples.

In one embodiment, the modification information comprises information of a specific class to be modified. For example, the information of the specific class may comprise identification information of the specific class, such as the name or identifier of the class. In some cases, the operation of the middleware may contain classes with the same name but that are loaded by different loaders. Thus, in one embodiment, the information of the specific class further comprises metadata associated with the specific class for assisting in positioning the specific class. This metadata may comprise a source of the specific class to be modified, information of a corresponding loader, and version information of the class. Additionally, the modification information further comprises modification content of the specific class that indicates what modification to be made to the specific class. In one embodiment, the modification content also comprises the modified content of the specific class, for example, the content of the updated version of the specific class. In another embodiment, the modification content comprises the modification which should be made to the specific class, that is, content of difference between before and after the modification is applied.

In one example, tenant A wants to modify a specific class "Class Example", which defines two member methods, method1 and method2, in its original version. Specifically, tenant A would like to modify the execution of method1, that is, to modify method1 as method1', and to add a new member method3. As described above, a packet is prepared in which the modification information comprises identification information and additional metadata of the class "Class Example", modification content for the class, and tenant information, which further comprises identification information of tenant A. The modification content may also further include content of updated version of the class, such as method1' method2, method3. The modification content may also comprise content of a difference before and after the modification, for example, method1' and the newly added method3.

In order to enable multiple tenants to share a same middleware while customizing it, different versions of the shared middleware are provided for multiple tenants. It may be appreciated that for a middleware implemented by an object-oriented program, various functional parts in the middleware may correspond to various classes in the program. Therefore, the customization of the functional parts in the middleware is actually equivalent to the modification of classes related to the functional parts in the middleware. On the other hand, for a shared middleware, various classes therein are also shared and used by multiple tenants. Therefore, in order to provide different versions of the middleware for different tenants, the embodiments of the present disclosure modify a shared class in runtime based on customization requirements of a specific tenant, without affecting the use of the class by other tenants.

Figure 4:
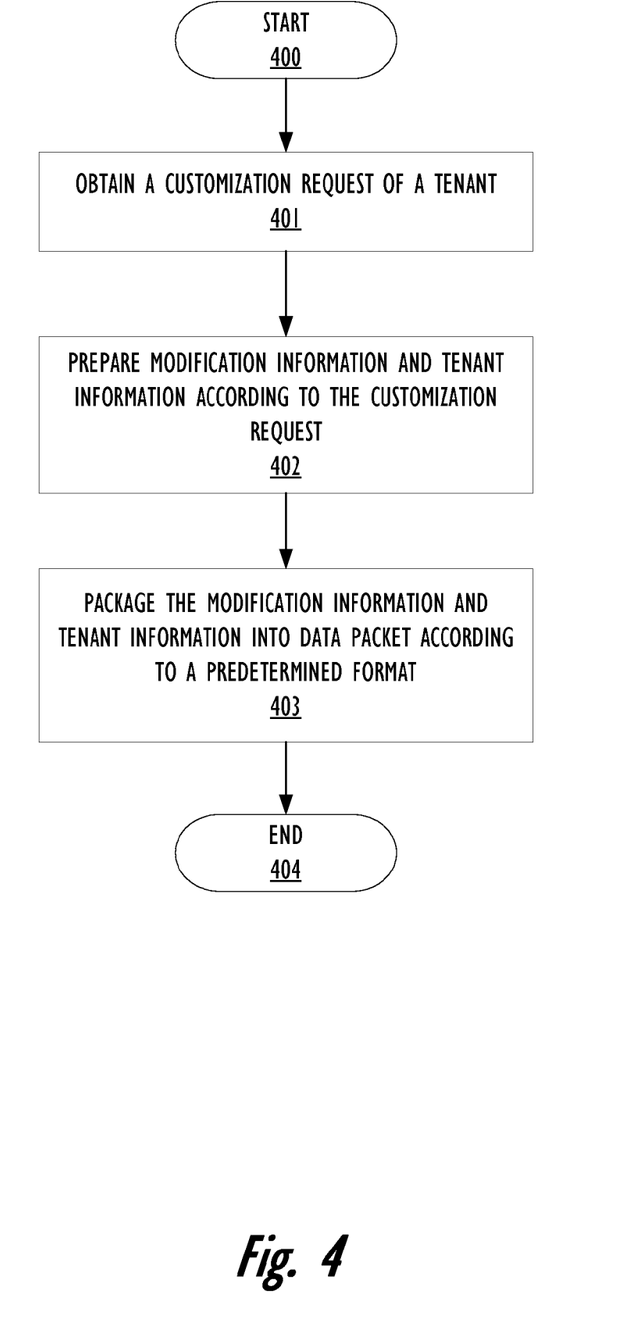
FIG. 4 is a flow diagram of a method of sub-steps for preparing a data packet according to an embodiment of the present disclosure.

At FIG. 4 there is depicted a flow diagram of a method of sub-steps for preparing a data packet according to an embodiment of the present disclosure. At step 401, a customization request of a tenant is obtained. Next, the modification information and tenant information are prepared according to the customization request (step 402). At step 403, the modification information and tenant information are packaged into a data packet according to a predetermined format. The predetermined format may be any pre-defined format which can be recognized by the runtime environment.

In one embodiment, the customization request has already indicated the specific class to be modified. In this embodiment, in step 402, it only needs to extract modification information from the customization request and acquire information of the tenant who issued the customization request.

In another embodiment, the customization request specifies only a functional part to be modified in the middleware. In such a case, at step 402, it is necessary to acquire a class corresponding to the functional part, and convert the modification on the functional part into the modification on the class, thereby preparing the modification information. Then, after the modification information and tenant information are prepared (step 403), the modification information and tenant information are organized into a predetermined format, thereby forming the desired data packet.

In one embodiment, the step of preparing a data packet further comprises notifying the data packet to the runtime environment running the middleware. The data packet is submitted to the runtime environment through a predetermined interface, so that the runtime environment acquires the data packet. In another embodiment, the data packet is stored in a predetermined position, so that the runtime environment may read it from the predetermined position, according to a prior agreement, to obtain the data packet. Depending on the setting of the runtime environment, the prepared data packet may also be reported to the runtime environment through other manners.

In response to the acquisition of the data packet, the specific class specified in the data packet is modified in runtime (as provided by step 304 of FIG. 3). In one embodiment, the middleware to be modified runs in a Java Runtime Environment (JRE). A parameter Java Agent of a Java Virtual Machine (JVM) may be used to make the modification of the class. Specifically, the Java Agent can re-define and modify the class loaded in runtime without modifying the original Java program code, thereby implementing a hot replacement or hot start. In the context of the Java Agent, a class file may be changed by adding self-defined ClassFileTransformer through Instrumentation inst in the parameter. The ClassFileTransformer is an interface of a class transformer provided by JRE for implementing the transformation of a class file. Thus, the class transformer may be invoked by the Java Agent and be used to implement the modification to the class file. Where the class transformer is invoked through the above interface, the transformation of the class occurs before the JVM defines the class. Therefore, the above interface is applicable where the class to be transformed has not been loaded. For a loaded class, the JRE further provides another interface Retransform. By calling the class transformer through this interface, a loaded class may be modified. Using this function of the class transformer, the specific class may be modified in runtime.

In one embodiment, it is first determined whether the specific class has already been loaded. If the specific class is not loaded, the process waits until runtime starts and then performs a load of the specific class. In the process of loading the specific class, the classloader may directly modify the specific class. If the specific class has been loaded, then the class transformer is connected through the interface Retransform to modify the specific class.

The above implementation of the modification of class is described in conjunction with a Java Running Environment. However, the embodiments of the present disclosure are not limited to Java language. Other similar running environment executed by a virtual machine based on class byte code, such as a C# running environment, also provides interfaces similar to the above class transformer. By calling an appropriate interface, a class loaded in runtime may be modified.

Figure 5:
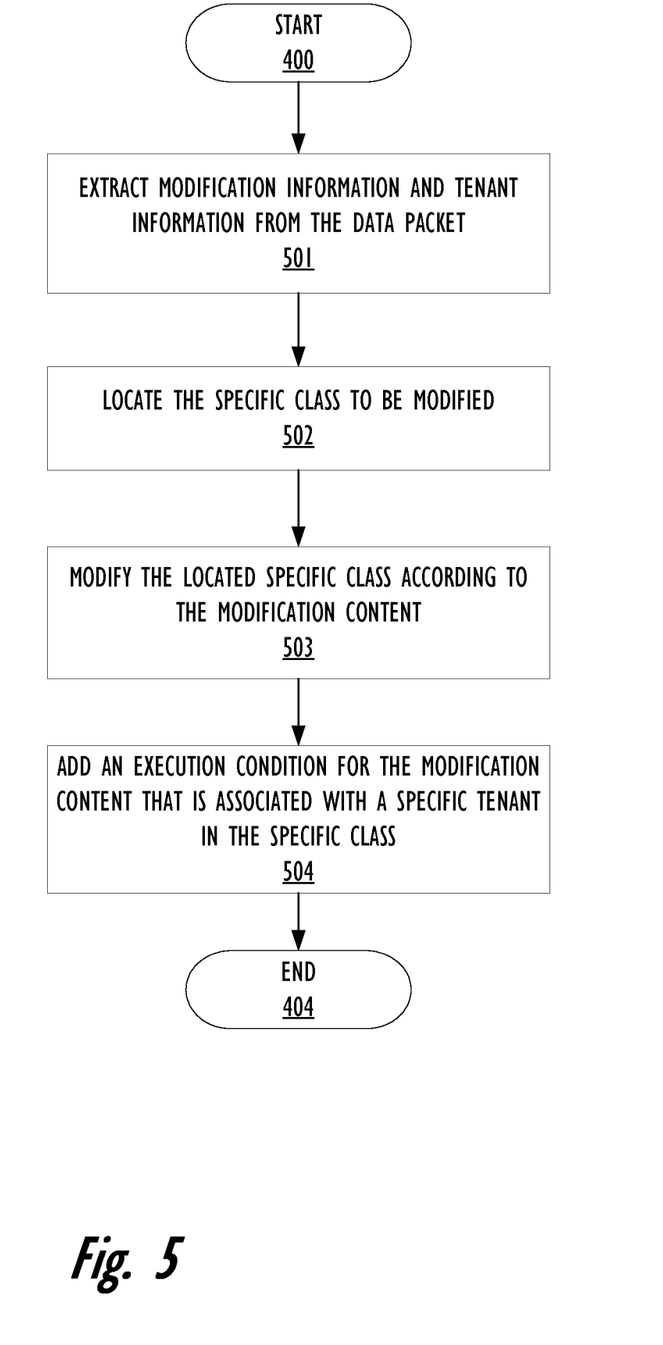
FIG. 5 is a flow diagram of a method of sub-steps for modifying a class according to an embodiment of the present disclosure.

With reference now to FIG. 5 there is depicted a flow diagram of a method of sub-steps for modifying a class, (the sub-steps of step 304 of FIG. 3) according to an embodiment of the present disclosure. At step 501, in response to acquisition of the data packet, modification information and tenant information are extracted from the data packet. As mentioned previously, the data packet is packed according to a predetermined format which can be recognized by the runtime environment. Thus, the runtime environment can easily perform data extraction and analysis with respect to the data packet in order to obtain the modification information and the tenant information. At step 502, based on the extracted data, the specific class to be modified is located from identification information of the specific class and metadata associated with the specific class stored in the modification information. In response to identification of the specific class, the runtime may accurately determine the specific class to be modified. Next, at step 503, the located specific class is modified according to the modification content. Then, an execution condition associated with a specific tenant is added in the specific class for the modification content (step 504). Both of steps 503 and 504 may be executed by the above class transformer.

As described above, in one embodiment, the modification content comprises modifications to the specific class. That is, the content of difference between before and after the modification. The modification may be directly performed according to the content of difference. In one embodiment, the modification content comprises content of an updated version of the specific class. In this embodiment, in step 503, content of original version of the specific class is firstly compared to the content of updated version, thereby determining the content of difference. The modification is then performed according to the content of difference. Specifically, for a redefined field and/or method included in the content of difference, the field and/or method is added into a class body of the specific class. Some program languages allow the addition of new variables or methods, for example, in the previous example, tenant A adds a completely new method3 when modifying Class Example. In case of such support by the program language, the newly added variable or method in the modification content may be added to the designated specific class.

For the above added variable/method, at step 504 execution condition corresponding to a specific tenant is added, so that the added variable/method only applies to the specific tenant. For example, a condition statement or a judgment statement is added before the added variable/method, so that the added variable/method is executed only for the specific tenant. Most programming languages do not allow deleting original elements (variables/methods) in the specific class. If the modification content designated by a tenant indicates that a certain variable/method is not needed, the execution of the variable/method may be skipped by adding an execution condition. Thus, by modifying a specific class and adding an execution condition corresponding to the specific tenant, the modified specific class becomes a "proxy" class. When the specific tenant accesses that specific class, the tenant first accesses the "proxy" class and then is guided, via the execution condition in the proxy class, to the version corresponding to the specific tenant, or a called "back-end" class. Thus, the specific tenant may obtain a version of customized class, without affecting other tenants. In the event multiple tenants each propose individual customization requests, the process steps of FIG. 3 may be executed with respect to each request of each tenant, so that each tenant obtains a version of its customized class.

Figure 6:
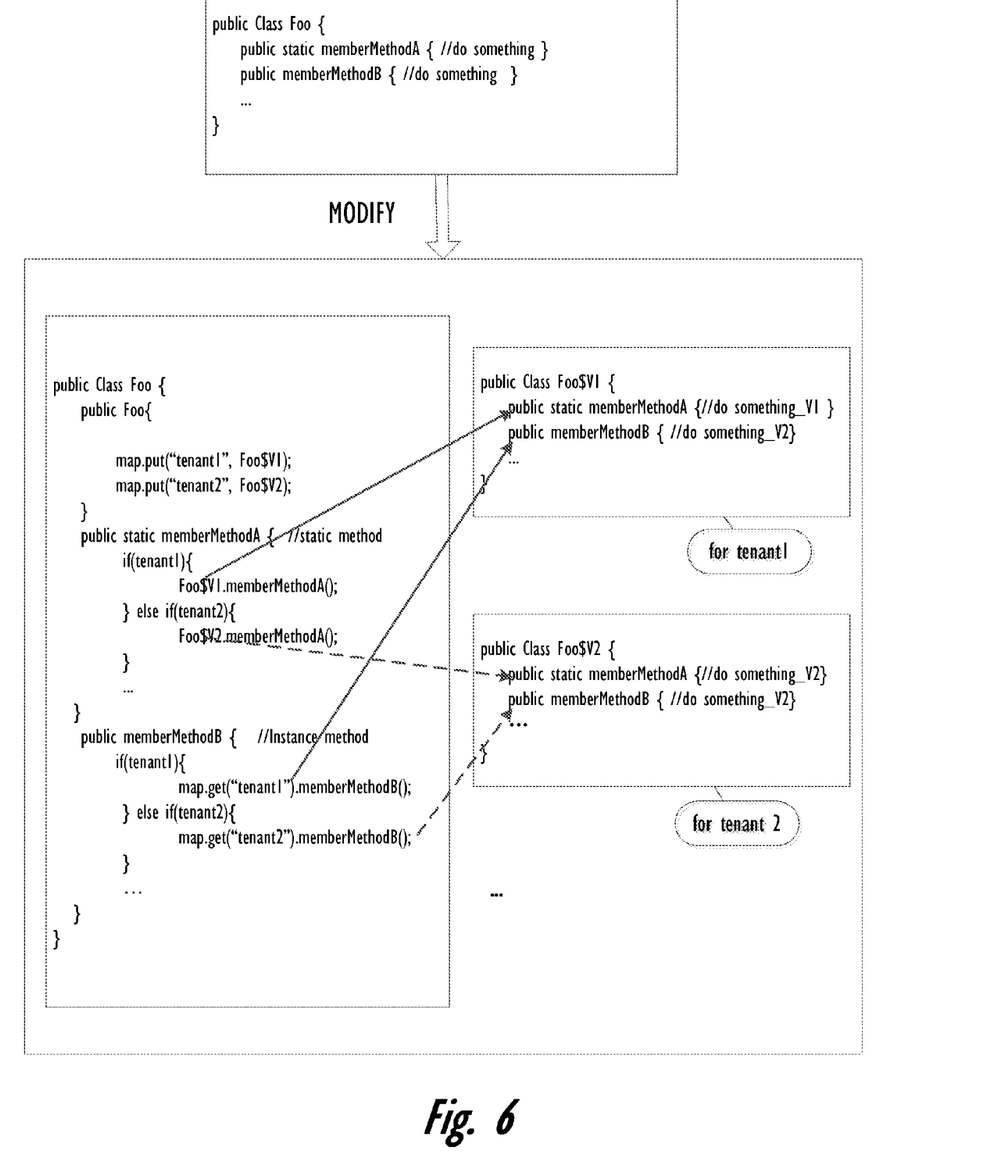
FIG. 6 is an illustration of an exemplary code to modify a class according to an embodiment of the present disclosure.

At FIG. 6 there is depicted an illustration of an exemplary code to modify a class according to an embodiment of the present disclosure. As illustrated, FIG. 6 shows a segment of exemplary code, wherein upper diagram shows the original version of Class Foo. In the original version, Class Foo defines member method A, method B, as well as other variables and methods therein. Assuming that tenant 1 indicates through its corresponding data packet a wish to modify methodA and methodB, the modified content is called v1 version. Thus, definitions for method A and method B are modified in Class Foo, in which the methods of the v1 version re-defined by tenant 1, namely Foo$V1.memberMethodA( ) and ("tenant1").memberMethodB( ), are added and an execution condition guided by if is also added before the new version.

After the judgment, if the current tenant is tenant 1, method A and method B of the modified v1 version are executed; otherwise the original version is still executed. Similarly, tenant 2 wishes to amend method A and method B as v2 version. In this case, the methods of v2 version re-defined by tenant 2, namely, Foo$V2.memberMethodA( ) and ("tenant2").memberMethodB( ), are added into the definitions for methodA and methodB, respectively, and likewise an execution condition guided by if is added before the new version. Thus, only in the case where the current tenant is tenant 2, method A and method B of modified v2 version are executed.

It should be noted that in the example of FIG. 6, method A is a static member method decorated by static, and method B is an instance member method. As is known in the art, static members belong to the entire class, and therefore static members can be accessed by visiting the class. However, for instance members, they must be accessed through objects. Therefore, the code of FIG. 6 is different for access processing of method A and method B. As to static member, method A, the newly defined version Foo$V1.memberMethodA( ) is directly obtained. As to instance member, method B, the instance is firstly stored as map (map.put("tenant1", Foo$V1)) with the tenant ID as a keyword, and then a query is made in the map using tenant ID so as to obtain the instance (map.get("tenant1").memberMethodB( )). Through the above modification to original Class Foo, the modified Class Foo functions as a "proxy" class. When a tenant accesses Class Foo, he first accesses the "proxyt" class, and is guided via the execution condition therein to a corresponding version. Specifically, through modified Class Foo as a "proxy", tenant 1 is guided to the class of v1 version (illustrated by solid arrows), tenant 2 is guided to the class of v2 version (illustrated by dashed arrows), and other tenants still execute the original version of Class Foo. Thus, while a class is shared by multiple tenants, a customized version may be provided for a specific tenant(s).

Those skilled in the art may appreciate that the above method A may be a static member method of any content, method B may be an instance member method of any content. In addition, while FIG. 6 provides modifying a class within Java, the modification manner can also be implemented in other forms and in other programming languages.

In one embodiment, when the class is modified according to the above execution manner, the method further comprises running the modified specific class. Since a modified specific class may point to a specific version corresponding to a specific tenant, each tenant will obtain a class of customized version, thereby obtaining a function part corresponding to the class. Thus, while multiple tenants share a same middleware, each tenant may also obtain customized function parts, achieving customization and modification of the middleware.

In one embodiment, the modified specific class may be stored. Specifically, a modified version of the shared specific class may be directly recorded and stored or the original version of the specific class and various versions corresponding to different tenants may be recorded. In one embodiment, the modified specific class is stored in a designated location of a nonvolatile medium. Thus, in the event the middleware needs to restart for some reason, the modified specific class may be read directly from the designated location, without having to prepare a data packet and modify the specific class again.

Figure 7:
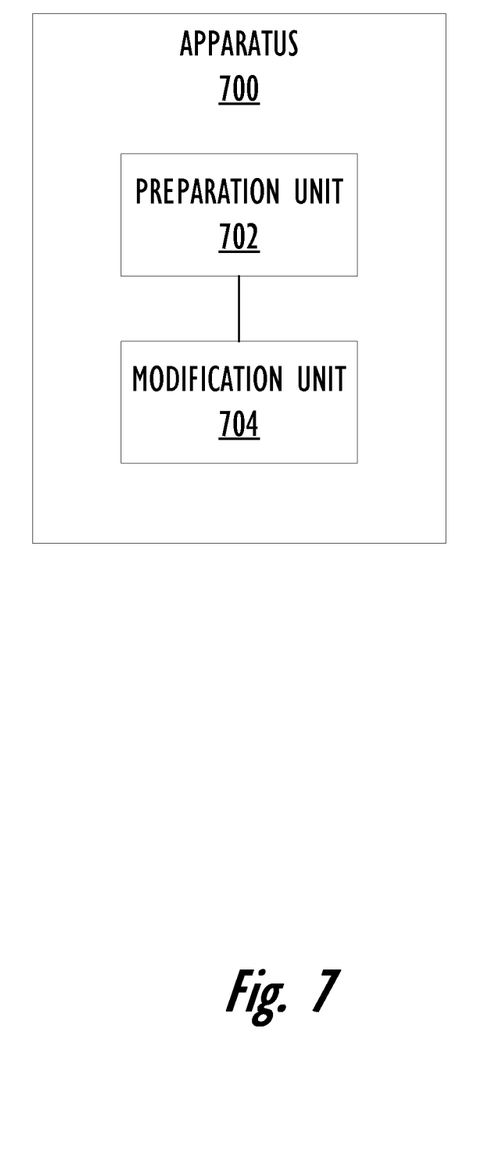
FIG. 7 is a block diagram of an apparatus according to an embodiment of the present disclosure.

At FIG. 7 there is depicted a block diagram of an apparatus according to an embodiment of the present disclosure. As shown in FIG. 7, apparatus 700 for modifying the middleware comprises: a preparation unit 702 and a modification unit 704. Preparation unit 702 is configured to prepare a data packets comprising modification information and tenant information, the modification information including information of a specific class to be modified and modification content for the specific class, the tenant information indicating a specific tenant to which the modification content is directed. According to one embodiment, the information of the specific class comprises identification information of the specific class and metadata associated with the specific class. Modification unit 704 is configured to modify, in response to obtaining the data packet, the specific class in the middleware in runtime according to the modification information, and make the modification content be applied only to the specific tenant. Preparation unit 702 may also be configured to obtain a customization request for the specific tenant, prepare the modification information and tenant information according to the customization request, and pack the modification information and tenant information into the data packet according to a predetermined format. According to one embodiment, the apparatus 700 further comprises a storage unit (not shown) configured to store the modified specific classes. The specific execution of the apparatus 700 for modifying the middleware may refer to the description of the method provided by FIG. 3 and in conjunction with the above examples, and will not be described in further detail here.

According to one embodiment, the customization request indicates modification to a specific function part of the middleware, and accordingly, preparation unit 702 is configured to obtain a class corresponding to the functional part as the specific class and transform the modification to the function part into the modification to the specific class. The preparation unit 702 is further configured to notify the data packet to the runtime environment running the above middleware and the modification unit 704 modifies the specific class through a class transformer in runtime. The modification unit 704 may further comprise (not shown) an extraction module configured to extract the modification information and tenant information from the data packet, a locating module configured to locate the specific class to be modified, a modification module configured to modify the specific class according to the modification content, and a condition addition module configured to add an execution condition associated with the specific tenant for the above modification content in the specific class.

In one embodiment, the modification content contains content of updated version of the specific class. Thus, the above modification module is configured to compare content of original version of the specific class to the content of updated version. Based on this comparison the modification module determines content of difference, and may modify the specific class according to the content of difference. The modification module may also be further configured to add at least one of a re-defined variable, a re-defined method, a newly added variable, and a newly added method in the content of difference of the specific class:

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some candidate implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be embodied as an apparatus, method or computer program product. Accordingly, aspects of the present disclosure may take the form of an entirely hardware embodiment, an entirely software embodiment (including, for example, firmware, resident software, microcode) or an embodiment combining software and hardware aspects that may all generally be referred to herein as a "circuit," "module" or "system." It will be understood by those skilled in the art that the apparatus that embodies a part or all of the present disclosure may be a general purpose device having at least one processing unit, a memory, and a software executing on the at least one processing unit that is further configured to provide a part or all of an embodiment of the disclosure. The device may be a single device or a group of devices.

The present disclosure can take the form of a computer program product accessible from a computer-usable or computer-readable storage medium providing program code for use by or in connection with a computer or any instruction execution system. For the purposes of this disclosure, a computer usable or computer-readable storage medium can be any tangible apparatus that contains, stores, communicates, propagates, or transports the program for use by or in connection with the instruction execution system, apparatus, or device. The medium can be an electronic, magnetic, optical, electromagnetic, or semiconductor system (or apparatus or device). Examples of a computer-readable storage medium/device include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. Program code embodied on a computer-readable storage medium may be transmitted using any appropriate medium, including, but not limited to wireless, wireline, optical fiber cable, RF, or any suitable combination of the foregoing.

The program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter solution, the remote computer may be connected to the user's computer via any type of network, including a local area network (LAN) or a wide area network (WAN), or the connection may be made to an external computer (for example, via the Internet using an Internet Service Provider).

While the present disclosure has been described with reference to exemplary embodiments, and while the embodiments have been described in considerable detail, it will be understood by those skilled in the art that various changes may be made and equivalents may be substituted for elements thereof without departing from the scope of the invention. Additional advantages and modifications will readily appear to those skilled in the art. The description of the present invention has been presented for purposes of illustration and description, but is not intended to be exhaustive or limited to the invention in the form disclosed. Many improvements, modifications, and variations will be apparent to those of ordinary skill in the art without departing from the scope and spirit of the present disclosure. In addition, many modifications may be made to adapt a particular system, device or component thereof to the teachings of the invention without departing from the essential scope thereof. The embodiment was chosen and described in order to best explain the principles of the invention and the practical application, and to enable others of ordinary skill in the art to understand the invention for various embodiments with various modifications as are suited to the particular use contemplated. Therefore, it is intended that the invention not be limited to the particular embodiments disclosed for carrying out this inven-

What is claimed is:

1. A method for modifying a middleware shared by a plurality of tenants, the method comprising:
   obtaining a customization request of a specific tenant of the plurality of tenants, wherein the customization request indicates one or more modifications to the middleware for only the specific tenant, wherein each tenant of the plurality of tenants all share the middleware and run one or more respective user applications on the middleware;
   preparing a data packet comprising modification information and tenant information that identifies the specific tenant, the modification information comprising information of a specific class to be modified in the middleware as well as modification content for the specific class, wherein the modification content comprises one of: a content of difference that comprises modifications to be directly applied to the specific class and an updated version of the specific class;
   storing the data packet in a predetermined position that is readable by a runtime environment according to a prior agreement; and
   in response to detecting a load of the specific class in runtime:
      retrieving the data packet from the predetermined position via the runtime environment; and
      modifying, via the runtime environment, the specific class in the middleware during loading for only the specific tenant according to the modification information to create a modified specific class without modifying program code in the original version of the specific class.

2. The method according to claim 1, wherein the information of the specific class comprises identification information of the specific class as well as metadata associated with the specific class, and wherein the specific class is shared by multiple tenants including the specific tenant.

3. The method according to claim 1, wherein the customization request indicates one or more modifications to a specific function part of the middleware for only the specific tenant, and wherein preparing the data packet comprises:
   identifying and obtaining a particular class corresponding to the specific function part of the middleware;
   transforming a modification to the specific function part of the middleware to one or more modifications to the specific class;
   preparing the modification information and the tenant information according to the one or more modifications to the specific class; and
   packing the modification information and tenant information into the data packet according to a predetermined format.

4. The method according to claim 1, wherein—preparing the data packet further comprises reporting the data packet to the runtime environment.

5. The method according to claim 1, wherein modifying the specific class further comprises modifying the specific class through a class transformer in runtime.

6. The method according to claim 1, wherein modifying the specific class further comprises:
   extracting the modification information and the tenant information from the data packet;
   locating the specific class;
   modifying the specific class according to the modification content;
   adding an execution condition in the specific class for the modification content that is associated with only the specific tenant in the specific class, wherein responsive to adding the execution condition for the specific tenant the modified specific class becomes a proxy class, wherein responsive to the specific tenant accessing the specific class the tenant is guided via the execution condition to a specific version of the specific class corresponding to only the specific tenant; and
   applying the modified content only to the specific tenant.

7. The method according to claim 6, wherein: modifying the specific class according to the modification content further comprises:
   in response to the modification content further comprising content of an updated version of the specific class:
      comparing content of the original version of the specific class with content of the updated version of the specific class to determine a content of difference; and
      modifying the specific class according to the content of difference.

8. The method according to claim 7, wherein modifying the specific class according to the content of difference further comprises adding, into the specific class, at least one item contained in the content of difference, the at least one item comprising one or more of:
   a re-defined variable, a re-defined method, a newly added variable, and a newly added method.

9. The method according to claim 1, further comprising storing the modified specific class.

10. The method according to claim 1, wherein multiple copies of the specific class having the same name exist in the plurality of classes, wherein each copy of the specific class is loaded by a different loader, and wherein the information of the specific class contains metadata that comprises one or more of: a source of the specific class to be modified, information of a corresponding loader, and version information of the specific class.

11. The method according to claim 1, wherein the modification content is designated by the specific tenant, the method further comprising:
   determining whether the modification content indicates at least one of a particular variable and a particular method in the specific class that is not needed; and
   in response to determining the modification content indicates at least one of a particular variable and a particular method in the specific class that is not needed, adding a second execution condition in the specific class that skips the at least one of the particular variable and the particular method, wherein the second execution condition is associated with only the specific tenant.

12. The method according to claim 11, wherein the second execution condition is added in response to determining that a programming language of the middleware does not allow for deleting original elements in the specific class.

* * * * *